US008802300B2

(12) United States Patent
Lee et al.

(10) Patent No.: US 8,802,300 B2
(45) Date of Patent: *Aug. 12, 2014

(54) RECHARGEABLE LITHIUM BATTERY

(75) Inventors: Jong-Hwa Lee, Yongin-si (KR);
Duck-Chul Hwang, Yongin-si (KR);
Jeom-Soo Kim, Yongin-si (KR);
Yong-Chul Park, Yongin-si (KR);
Jae-Yul Ryu, Yongin-si (KR);
Euy-Young Jung, Yongin-si (KR);
So-Hyun Hur, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1166 days.

This patent is subject to a terminal disclaimer.

(21) Appl. No.: 11/876,999

(22) Filed: Oct. 23, 2007

(65) Prior Publication Data
US 2008/0118846 A1    May 22, 2008

(30) Foreign Application Priority Data

Nov. 17, 2006    (KR) .................. 10-2006-0113991

(51) Int. Cl.
*H01M 6/16*    (2006.01)

(52) U.S. Cl.
USPC ...... 429/339; 429/307; 429/231.1; 429/231.3; 429/231.2; 429/231.8; 429/231.4; 429/231.5; 429/231.6; 429/231.95; 429/330; 429/338

(58) Field of Classification Search
CPC ..... H01M 4/131; H01M 4/405; H01M 4/525; H01M 4/583; H01M 4/587; H01M 10/0526; H01M 10/0567; H01M 10/0568; H01M 10/0569; H01M 2004/028; H01M 2004/027; H01M 2004/021; H01M 2300/0028
USPC ............... 429/339, 307, 231.1, 231.3, 231.2, 429/231.8, 231.4, 231.5, 231.6, 231.95, 429/330, 338
See application file for complete search history.

(56) References Cited

U.S. PATENT DOCUMENTS

| | | | |
|---|---|---|---|
| 4,964,878 A * | 10/1990 | Morris ........................ | 429/210 |
| 5,418,682 A | 5/1995 | Warren, Jr. et al. | |
| 5,589,295 A | 12/1996 | Derzon et al. | |
| 6,482,547 B1 | 11/2002 | Yoon et al. | |
| 6,506,524 B1 | 1/2003 | McMillan et al. | |
| 6,743,947 B1 | 6/2004 | Xu et al. | |
| 7,335,446 B2 | 2/2008 | Chiga et al. | |
| 7,521,151 B2 * | 4/2009 | Hwang et al. ............ | 429/231.95 |
| 7,622,222 B2 | 11/2009 | Chiga et al. | |
| 7,691,537 B2 | 4/2010 | Kim | |
| 7,718,311 B2 | 5/2010 | Yamaguchi et al. | |
| 7,776,475 B2 | 8/2010 | Shimizu et al. | |
| 2002/0037450 A1 * | 3/2002 | Suzuki et al. ................ | 429/232 |
| 2004/0013946 A1 | 1/2004 | Abe et al. | |
| 2004/0151981 A1 | 8/2004 | Spahr et al. | |
| 2004/0197667 A1 | 10/2004 | Noh et al. | |
| 2004/0201366 A1 | 10/2004 | Kimoto et al. | |
| 2004/0214092 A1 | 10/2004 | Noh et al. | |
| 2005/0031963 A1 | 2/2005 | Im et al. | |
| 2005/0069767 A1 * | 3/2005 | Tsunekawa et al. .......... | 429/209 |
| 2005/0069775 A1 * | 3/2005 | Hwang et al. .............. | 429/231.1 |
| 2005/0208371 A1 | 9/2005 | Kim et al. | |
| 2005/0221168 A1 | 10/2005 | Dahn et al. | |
| 2006/0024584 A1 * | 2/2006 | Kim et al. ..................... | 429/339 |
| 2006/0078787 A1 * | 4/2006 | Sato et al. ....................... | 429/62 |
| 2006/0194118 A1 | 8/2006 | Yew et al. | |
| 2006/0204834 A1 | 9/2006 | Kim et al. | |
| 2006/0222937 A1 * | 10/2006 | Morimoto et al. ............ | 429/164 |
| 2007/0009806 A1 | 1/2007 | Kim | |
| 2007/0231705 A1 | 10/2007 | Ohzuku et al. | |
| 2008/0057402 A1 | 3/2008 | Abe et al. | |
| 2008/0102369 A1 | 5/2008 | Sakata et al. | |
| 2008/0118847 A1 | 5/2008 | June et al. | |
| 2008/0152998 A1 | 6/2008 | Murakami et al. | |
| 2008/0220336 A1 * | 9/2008 | Mun et al. ..................... | 429/338 |
| 2008/0248396 A1 | 10/2008 | Jung et al. | |
| 2008/0248397 A1 | 10/2008 | Jung et al. | |
| 2009/0047582 A1 | 2/2009 | Kim et al. | |
| 2009/0142663 A1 | 6/2009 | Takeuchi et al. | |
| 2009/0181301 A1 | 7/2009 | Kim et al. | |
| 2009/0253045 A1 | 10/2009 | Kotato et al. | |
| 2010/0167131 A1 | 7/2010 | Kim et al. | |
| 2010/0233549 A1 | 9/2010 | Kim et al. | |

FOREIGN PATENT DOCUMENTS

| | | |
|---|---|---|
| CN | 1237003 | 12/1999 |
| CN | 14876271 | 4/2004 |
| CN | 1543006 A | 11/2004 |
| CN | 1612405 A | 5/2005 |
| CN | 1650466 | 8/2005 |

(Continued)

OTHER PUBLICATIONS

SIPO Reexamination Decision dated Apr. 11, 2013, with English translation, for corresponding Chinese Patent application 200710181435.0, (22 pages).
Patent Abstracts of Japan and English machine translation of Japanese Publication 2003-197190, (63 pages).
English machine translation of Japanese Publication 2005-066407, (11 pages).
Patent Abstracts of Japan and English machine translation of Japanese Publication 2009-158464, (56 pages).
Derwent Abstract and English machine translation of International application WO 03/075371, (14 pages).
KIPO Office action dated Sep. 21, 2009 for Korean Patent application 10-2007-0130804, (7 pages).

(Continued)

Primary Examiner — Laura Weiner
(74) Attorney, Agent, or Firm — Christie, Parker & Hale, LLP

(57) ABSTRACT

A rechargeable lithium battery including a positive electrode including a positive active material, a negative electrode including a negative active material, and a non-aqueous electrolyte including a non-aqueous organic solvent and a lithium salt. The positive electrode has an active-mass density of about 3.7 to 4.1 g/cc, and the non-aqueous electrolyte includes a nitrile-based compound additive, a non-aqueous organic solvent, and a lithium salt.

11 Claims, 1 Drawing Sheet

(56) References Cited

FOREIGN PATENT DOCUMENTS

| | | |
|---|---|---|
| CN | 1847155 A | 10/2006 |
| CN | 101170201 | 4/2008 |
| EP | 1 150 374 A1 | 10/2001 |
| EP | 1 463 143 A2 | 9/2004 |
| EP | 1 508 934 A1 | 2/2005 |
| EP | 1 696 501 A1 | 8/2006 |
| EP | 1 742 281 A1 | 1/2007 |
| EP | 1 463 143 A3 | 4/2008 |
| EP | 2 108 640 A1 | 10/2009 |
| JP | 10-069915 | 3/1998 |
| JP | 10-247519 | 9/1998 |
| JP | 2003-173816 | 6/2003 |
| JP | 2003-197190 | 7/2003 |
| JP | 2005-505904 | 2/2005 |
| JP | 2005/066407 | 3/2005 |
| JP | 2006-107815 | 4/2006 |
| JP | 2006-245001 | 9/2006 |
| JP | 2008-108586 | 5/2008 |
| JP | 2008-235008 | 10/2008 |
| JP | 2009-158464 | 7/2009 |
| JP | 2009-527088 | 7/2009 |
| KR | 10-2000-0073252 | 12/2000 |
| KR | 10-2000-0074691 | 12/2000 |
| KR | 10-2001-0098895 | 11/2001 |
| KR | 10-2001-0104150 | 11/2001 |
| KR | 10-2002-0029813 | 4/2002 |
| KR | 10-2003-0057321 | 7/2003 |
| KR | 10-2005-0075297 | 7/2005 |
| KR | 10-2005-0078443 | 8/2005 |
| KR | 10-2005-0089246 | 9/2005 |
| KR | 10-2005-0114698 | 12/2005 |
| KR | 2006-35767 | 4/2006 |
| KR | 10-2006-0044919 | 5/2006 |
| KR | 2006-60683 | 6/2006 |
| KR | 10-2006-0075966 | 7/2006 |
| KR | 10-2006-0114919 | 11/2006 |
| KR | 10-2007-0006253 | 1/2007 |
| KR | 10-2007-0075355 | 7/2007 |
| KR | 10-2007-0091938 | 9/2007 |
| KR | 10-0814827 B1 | 3/2008 |
| KR | 10-2008-0031151 | 4/2008 |
| KR | 10-2008-0037574 | 4/2008 |
| KR | 10-2009-0063441 | 6/2009 |
| TW | 200520276 | 6/2005 |
| WO | WO 97/35332 A1 | 9/1997 |
| WO | WO 98/15024 A1 | 4/1998 |
| WO | WO 03/032415 A2 | 4/2003 |
| WO | WO 03/075371 A2 | 9/2003 |
| WO | WO 2005/069423 A1 | 7/2005 |
| WO | WO 2007/081169 A1 | 7/2007 |
| WO | WO 2007/094625 * | 8/2007 |
| WO | WO 2007/094626 A1 | 8/2007 |
| WO | WO 2007/142121 A1 | 12/2007 |
| WO | WO 2008/093837 A1 | 8/2008 |

OTHER PUBLICATIONS

KIPO Office action dated Jun. 25, 2010 for Korean Patent application 10-2008-0065442, (5 pages).
KIPO Office action dated Oct. 25, 2010 for Korean Patent application 10-2008-0065442, (5 pages).
KIPO Office action dated Jun. 27, 2011 for Korean Patent application 10-2008-0065442, (5 pages).
KIPO Office action dated Aug. 29, 2011 for Korean Patent application 10-2009-0123992, (4 pages).
SIPO Office action dated Apr. 21, 2011, for Chinese Patent application 200910140202, with English translation, (21 pages).
SIPO Reexamination dated Feb. 5, 2013, for corresponding Chinese Patent application 200710181435.0, with English translation, (11 pages).
Int'l Search Report dated Apr. 20, 2007, and Written Opinion for Int'l Patent application PCT/KR2007/000214, (6 pages).
Japanese Office action dated Nov. 29, 2011, for Japanese Patent application 2008-292467, (3 pages).
U.S. Office action dated Feb. 13, 2012, (10 pages).
U.S. Office action dated Nov. 19, 2010, for cross reference U.S. Appl. No. 11/808,732, (17 pages).
U.S. Office action dated Mar. 24, 2011, for cross reference U.S. Appl. No. 11/808,732, (19 pages).
U.S. Office action dated Aug. 4, 2011, for cross reference U.S. Appl. No. 12/334,337, (14 pages).
U.S. Office action dated Aug. 8, 2011, for cross reference U.S. Appl. No. 11/808,732, (20 pages).
U.S. Office action dated Apr. 21, 2011, for cross reference U.S. Appl. No. 12/223,950, (9 pages).
U.S. Office action dated Oct. 19, 2011, for cross reference U.S. Appl. No. 12/087,813, (8 pages).
U.S. Office action dated Jan. 26, 2012, for cross reference U.S. Appl. No. 12/458,219, (17 pages).
U.S. Office action dated Jul. 2, 2012, for cross reference U.S. Appl. No. 12/580,995, (13 pages).
U.S. Office action dated Oct. 15, 2012, for cross reference U.S. Appl. No. 12/580,995, (11 pages).
European Search Report dated Mar. 31, 2010 European Patent application 10250076.6, (6 pages).
European Office action dated Jul. 27, 2012, for European Patent application 10250076.6, (3 pages).

* cited by examiner

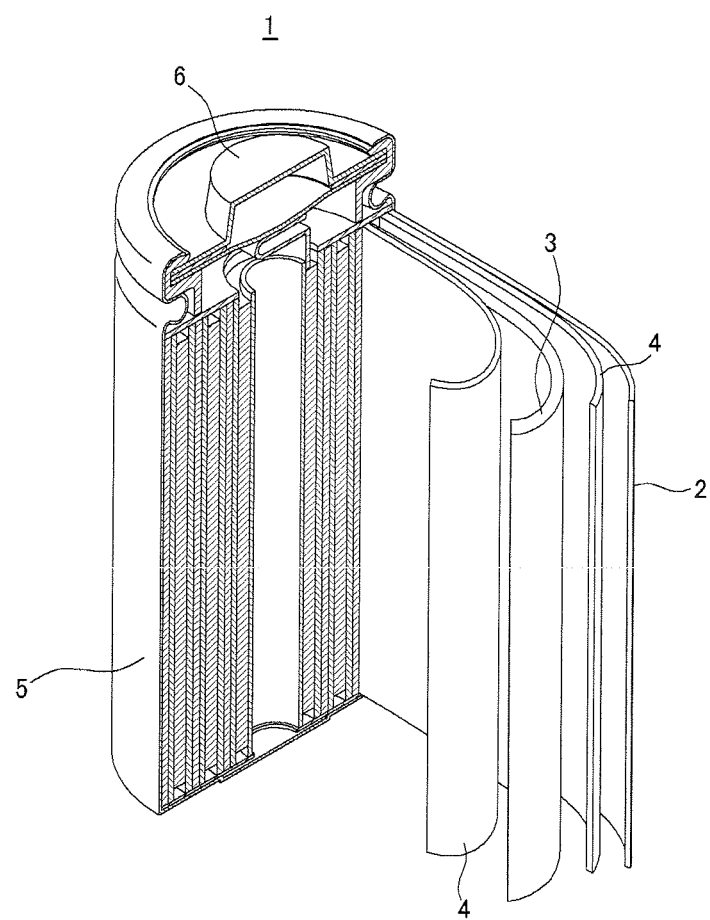

RECHARGEABLE LITHIUM BATTERY

CROSS-REFERENCE TO RELATED APPLICATION

This application claims the benefit of Korean Application No. 2006-113991, filed Nov. 17, 2006, in the Korean Intellectual Property Office, the disclosure of which is incorporated herein, by reference.

BACKGROUND OF THE INVENTION

1. Field of the Invention

Aspects of the present invention relate to lithium rechargeable batteries.

2. Description of the Related Art

Lithium rechargeable batteries have recently drawn attention for use as power sources for portable electronic devices. Lithium rechargeable batteries use an organic electrolyte solution, have a high energy density, and have a discharge voltage that is twice as high as a conventional alkaline battery. Rechargeable lithium batteries contain a positive active material, for example lithium-transition element composite oxides capable of intercalating lithium, such as, $LiCoO_2$, $LiMn_2O_4$, $LiNiO_2$, $LiNi_{1-x}Co_xO_2$ (0<x<1), $LiMnO_2$, and the like. Rechargeable lithium batteries contain a negative active material, for example various carbon-based materials, such as, artificial graphite, natural graphite, and hard carbon, which can all intercalate and deintercalate lithium ions. Recently, batteries having high-capacity and improved cycle-life characteristics have been researched, but as yet, they have not approached a satisfactory performance level.

SUMMARY OF THE INVENTION

Various embodiments of the present invention provide a rechargeable lithium battery that has a high capacity and improved cycle-life characteristics.

According to various embodiments of the present invention, provided is a rechargeable lithium battery including a positive electrode including a positive active material, a negative electrode including a negative active material, and a non-aqueous electrolyte. The positive electrode has an active-mass density of about 3.7 to 4.1 g/cc. The non-aqueous electrolyte includes a nitrile-based compound additive, a non-aqueous organic solvent, and a lithium salt.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a schematic cross-sectional view of a rechargeable lithium battery according to one embodiment of the present invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the aspects of present invention, by referring to the figure.

Aspects of the present invention relate to a rechargeable lithium battery that includes a positive electrode with a high active-mass density. The rechargeable lithium battery has improved cycle-life characteristics and reliability at high temperatures. The rechargeable lithium battery, according to an exemplary embodiment of the present invention, includes a positive electrode including a positive active material, a negative electrode including a negative active material, and a non-aqueous electrolyte.

The positive electrode has an active-mass density of about 3.7 to 4.1 g/cc. The non-aqueous electrolyte includes a nitrile-based compound additive, a non-aqueous organic solvent, and a lithium salt. Generally, a positive electrode having a high active-mass density is used to provide a high-capacity battery. However, if the active-mass density of a positive electrode is increased, room temperature cycle-life characteristics may be degraded. For this reason, the active-mass density of a positive electrode, used in the related art rechargeable lithium batteries, is about 3.6 g/cc. On the contrary, according to aspects of the present invention, the nitrile-based compound additive can provide a high-capacity battery, as well as improved cycle-life characteristics, at room temperature, even though the positive electrode has a relatively higher active-mass density of about 3.7 to 4.1 g/cc.

Examples of the nitrile-based compound include, at least one selected from the group consisting of succinonitrile, glutaronitrile, adiponitrile, pimelonitrile, suberonitrile, and combinations thereof. According to various embodiments, adiponitrile may be appropriate.

The nitrile-based compound additive ranges from about 0.01 to 10 wt %, based on the total weight of the non-aqueous electrolyte. The nitrile-based compound additive may be used in an amount of about 0.5 to 5 wt %. When the amount of the nitrile-based compound additive is less than about 0.01 wt %, enhanced battery performance may not be realized. When the amount of the nitrile-based compound additive is more than 10 wt %, electrolyte ion conductivity may be reduced, and side-reactions may be increased, resulting in a small initial capacity.

The non-aqueous electrolyte can include a non-aqueous organic solvent and a lithium salt, as well as the nitrile-based compound additive. The non-aqueous organic solvent acts as a medium for transmitting ions that take part in the electrochemical reactions of the battery.

The non-aqueous organic solvent may include a solvent that is carbonate-based, ester-based, ether-based, ketone-based, alcohol-based, or aprotic. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include n-methyl acetate, n-ethyl acetate, n-propyl acetate, dimethylacetate, methylpropinonate, ethylpropinonate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like. Examples of the ketone-based solvent include cyclohexanone, and the like. Examples of the alcohol-based solvent include ethyl alcohol, isopropyl alcohol, and the like. Examples of the aprotic solvent include: nitriles, such as, R—CN (where R is a $C_2$ to $C_2O$ linear, branched, or cyclic hydrocarbon, a double bond, an aromatic ring, or an ether bond); amides, such as dimethylformamide; dioxolanes, such as, 1,3-dioxolane, sulfolanes, and the like.

The non-aqueous organic solvent may be used singularly or in a mixture. When the organic solvent is used in a mixture, a mixture ratio may be controlled in accordance with a desired battery performance.

The carbonate-based solvent may include a mixture of a cyclic carbonate and a linear carbonate. The cyclic carbonate and the linear carbonate can be mixed together in a volume ratio of about 1:1 to 1:9. When the mixture is used as an electrolyte, the electrolyte performance may be enhanced.

The electrolyte may further include mixtures of carbonate-based solvents and aromatic hydrocarbon-based solvents. The carbonate-based solvents and the aromatic hydrocarbon-based solvents can be mixed together in the volume ratio of about 1:1 to 30:1.

The aromatic hydrocarbon-based organic solvent may be represented by Formula 1.

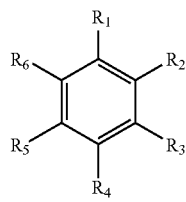

Formula 1

In Formula 1, $R_1$ to $R_6$ are independently selected from the group consisting of hydrogen, a halogen, a $C_1$ to $C_{10}$ alkyl, a haloalkyl, and combinations thereof.

The aromatic hydrocarbon-based organic solvent may include, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous electrolyte may further include an overcharge inhibition additive, such as, ethylene carbonate, pyrocarbonate, and the like.

The lithium salt can be dissolved in the non-aqueous organic solvent, to supply lithium ions in the rechargeable lithium battery. The lithium salt may facilitate a basic operation in the rechargeable lithium battery, and can facilitate the transmission of lithium ions between positive and negative electrodes. Non-limiting examples of the lithium salt include at least one supporting electrolyte salt selected from the group consisting of $LiPF_6$, $LiBF_4$, $LiSbF_6$, $LiAsF_6$, $LiCF_3SO_3$, $LiN(SO_2C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, lithium bisoxalate borate, and combinations thereof. The lithium salt may be used at about a 0.1 to 2.0M concentration. When the lithium salt concentration is less than about 0.1M, the performance of the electrolyte may be compromised, due to a reduction in the conductivity of the electrolyte. When the lithium salt concentration is more than about 2.0M, lithium ion mobility may be reduced, due to an increase in the viscosity of the electrolyte.

The negative active material in the negative electrode may include at least one selected from the group consisting of a carbonaceous material, a lithium metal, a lithium alloy, a material capable of forming a lithium-containing compound, and combinations thereof. According to various embodiments, the carbonaceous material may be appropriate for the negative active material.

The carbonaceous material may be amorphous carbon or crystalline carbon. The amorphous carbon may be a soft carbon (carbon obtained by sintering at a low temperature), a hard carbon (carbon obtained by sintering at a high temperature), mesophase pitch carbide, fired coke, and the like. The crystalline carbon may be shaped or unshaped. The shaped crystalline carbon may be shaped as a sheet, a flake, a sphere, or a fiber. The crystalline carbon may be natural graphite or artificial graphite.

The carbonaceous material has an Lc (crystallite size) of at least about 10 nm, as found through X-ray diffraction. According to various embodiments, the carbonaceous material has an Lc (crystallite size) of from about 10 to 1500 nm, as found through X-ray diffraction. The carbonaceous material exhibits an exothermic peak at about 700° C. or more. The exothermic peak differentiates a crystalline and an amorphous carbon. The exothermic peak at about 700° C. or more, indicates a crystalline carbon, and therefore, the maximum value of exothermic temperature need not be limited.

The crystalline carbon may be a carbon prepared by carbonizing mesophase spherical particles, then graphitizing the produced carbonized material. Further, the carbonaceous material may be a graphite fiber prepared by carbonizing a mesophase pitch fiber and then graphitizing the produced carbonized material.

The lithium alloy includes lithium and a metal selected from the group consisting of Na, K, Rb, Cs, Fr, Be, Mg, Ca, Sr, Ba, Ra, Al, and Sn.

The material capable of reversibly forming a lithium-containing compound, by reaction with lithium ions, can include tin oxide ($SnO_2$), titanium nitrate, silicon (Si), and the like, but is not limited thereto.

The negative electrode may be fabricated as follows. A negative active material composition is prepared by mixing a negative active material, a binder, and optionally a conductive agent. Then the composition is applied on a negative current collector. The composition and current collector are then dried and compressed. The negative electrode manufacturing methods are well known, and thus, are not described in detail, herein.

Examples of the binder include polyvinylalcohol, carboxylmethyl cellulose, hydroxypropyl cellulose, diacetyl cellulose, polyvinylchloride, polyvinylpyrrolidone, polytetrafluoroethylene, polyvinylidene fluoride, polyethylene, polypropylene, and combinations thereof, but are not limited thereto.

Any electrically conductive material may be used as a conductive agent, so long as it has suitable electrical conductivity and chemical stability. Examples of the conductive agent include: natural graphite; artificial graphite; carbon black; acetylene black; ketjen black; a carbon fiber; a metal powder; a metal fiber including copper, nickel, aluminum, silver, and the like; and a polyphenylene derivative.

The solvent can include N-methylpyrrolidone, but is not limited thereto.

The current collector may be selected from the group consisting of a copper foil, a nickel foil, a stainless steel foil, a titanium foil, a nickel foam, a copper foam, a polymer substrate coated with a conductive metal, and combinations thereof.

The positive electrode includes a positive active material, such as a lithiated intercalation compound capable of intercalating and deintercalating lithium. Examples of the lithiated intercalation compound include a composite oxide including lithium and a metal selected from the group consisting of cobalt, manganese, nickel, and combinations thereof. More specifically, the lithiated intercalation compound can be exemplified by compounds of Formulas 2 to 25.

$$Li_aA_{1-b}B_bD_2, \qquad \text{Formula 2:}$$

wherein, $0.95 \leq a \leq 1.1$ and $0 \leq b \leq 0.5$.

$$Li_aE_{1-b}B_bO_{2-c}F_c, \qquad \text{Formula 3:}$$

wherein, $0.95 \leq a \leq 1.1$, $0 \leq b \leq 0.5$, and $0 \leq c \leq 0.05$.

$$LiE_{2-b}B_bO_{4-c}F_c, \qquad \text{Formula 4:}$$

wherein, $0 \leq b \leq 0.5$, and $0 \leq c \leq 0.05$.

$$Li_aNi_{1-b-c}Co_bB_cD_\alpha, \qquad \text{Formula 5:}$$

wherein, $0.95 \leq a \leq 1.1$, $0 \leq b \leq 0.5$, $0 \leq c \leq 0.05$, and $0 < \alpha \leq 2$.

$$Li_aNi_{1-b-c}Co_bB_cO_{2-\alpha}F_\alpha, \qquad \text{Formula 6:}$$

wherein, $0.95 \leq a \leq 1.1$, $0 \leq b \leq 0.5$, $0 \leq c \leq 0.05$, and $0 < \alpha < 2$.

$$Li_aNi_{1-b-c}Co_bB_cO_{2-\alpha}F_2, \qquad \text{Formula 7:}$$

wherein, $0.95 \leq a \leq 1.1$, $0 \leq b \leq 0.5$, $0 \leq c \leq 0.05$, and $0 < \alpha < 2$.

$$Li_aNi_{1-b-c}Mn_bB_cD_\alpha, \qquad \text{Formula 8:}$$

wherein, $0.95 \leq a \leq 1.1$, $0 \leq b \leq 0.5$, $0 \leq c \leq 0.05$, and $0 < \alpha \leq 2$.

$$Li_aNi_{1-b-c}Mn_bB_cO_{2-\alpha}F_\alpha, \qquad \text{Formula 9:}$$

wherein, $0.95 \leq a \leq 1.1$, $0 \leq b \leq 0.5$, $0 \leq c \leq 0.05$, and $0 < \alpha < 2$.

$$Li_aNi_{1-b-c}Mn_bB_cO_{2-\alpha}F_2, \qquad \text{Formula 10:}$$

wherein, $0.95 \leq a \leq 1.1$, $0 \leq b \leq 0.5$, $0 \leq c \leq 0.05$, and $0 < \alpha < 2$.

$$Li_aNi_bE_cG_dO_2, \qquad \text{Formula 11:}$$

wherein, $0.90 \leq a \leq 1.1$, $0 \leq b \leq 0.9$, $0 \leq c \leq 0.5$, and $0.001 \leq d \leq 0.1$.

$$Li_aNi_bCo_cMn_dG_eO_2, \qquad \text{Formula 12:}$$

wherein, $0.90 \leq a \leq 1.1$, $0 \leq b \leq 0.9$, $0 \leq c \leq 0.5$, $0 \leq d \leq 0.5$, and $0.001 \leq e \leq 0.1$.

$$Li_aNiG_bO_2, \qquad \text{Formula 13:}$$

wherein, $0.90 \leq a \leq 1.1$ and $0.001 \leq b \leq 0.1$.

$$Li_aCoG_bO_2, \qquad \text{Formula 14:}$$

wherein, $0.90 \leq a \leq 1.1$ and $0.001 \leq b \leq 0.1$.

$$Li_aMnG_bO_2, \qquad \text{Formula 15:}$$

wherein, $0.90 \leq a \leq 1.1$ and $0.001 \leq b \leq 0.1$.

$$Li_aMn_2G_bO_4, \qquad \text{Formula 16:}$$

wherein, $0.90 \leq a \leq 1.1$ and $0.001 \leq b \leq 0.1$.

$$QO_2 \qquad \text{Formula 17:}$$

$$QS_2 \qquad \text{Formula 18:}$$

$$LiQS_2 \qquad \text{Formula 19:}$$

$$V_2O_5 \qquad \text{Formula 20:}$$

$$LiV_2O_5 \qquad \text{Formula 21:}$$

$$LiIO_2 \qquad \text{Formula 22:}$$

$$LiNiVO_4 \qquad \text{Formula 23:}$$

$$Li_{3-f}J_2(PO_4)_3 \ (0 \leq f \leq 3) \qquad \text{Formula 24:}$$

$$Li_{3-f}Fe_2(PO_4)_3 \ (0 \leq f \leq 2) \qquad \text{Formula 25:}$$

In Formulas 2 to 25: A is selected from the group consisting of Ni, Co, Mn, and combinations thereof; B is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; F is selected from the group consisting of F, S, P, and combinations thereof; G is a transition element or a lanthanide element selected from the group consisting of Al, Cr, Mn, Fe, Mg, La, Ce, Sr, V, and combinations thereof; Q is an element selected from the group consisting of Ti, Mo, Mn, and combinations thereof; I is an element selected from the group consisting of Cr, V, Fe, Sc, Y, and combinations thereof; and J is an element selected from the group consisting of V, Cr, Mn, Co, Ni, Cu, and combinations thereof.

The lithiated intercalation compound may include a coating layer on the surface thereof, or may be mixed with another lithiated intercalation compound having a coating layer. The coating layer includes at least one coating element-containing compound selected from the group consisting of a coating element-containing hydroxide, a coating element-containing oxyhydroxide, a coating element-containing oxycarbonate, a coating element-containing hydroxycarbonate, and combinations thereof. The coating element-containing compound may be amorphous or crystalline. Examples of the coating element include at least one selected from the group consisting of Mg, Al, Co, K, Na, Ca, Si, Ti, V, Sn, Ge, Ga, B, As, Zr, and combinations thereof. The coating layer may be formed by any coating method that does not have an unfavorable effect on properties of the positive active material. Examples of suitable coating methods include spray coating, and dipping. Since such a coating method is well known in this art, a detailed description is not provided.

The positive electrode can be fabricated as follows. A positive active material composition is prepared by mixing a positive active material, a binder, and a conductive agent. The composition is then applied on a positive current collector, such as aluminum foil, then dried and compressed. The positive electrode manufacturing method is well known, and thus it is not described in detail herein. The active-mass density of the positive electrode may be controlled during the fabrication of the positive electrode by altering a compressing pressure, compressing time, and a compressing temperature. The compressing pressure, compressing time, and compressing temperature are not specifically limited. However, they may be controlled such that the fabricated positive electrode may have an active-mass density of about 3.7 to 4.1 g/cc.

Any electrically conductive material maybe used as a conductive agent, so long as it has suitable electrical conductivity and chemical stability. Examples of the conductive agent include: natural graphite; artificial graphite; carbon black; acetylene black; ketjen black; a carbon fiber; a metal powder; a metal fiber including copper, nickel, aluminum, silver, or the like; and a polyphenylene derivative.

Examples of the binder include polyvinyl alcohol, carboxylmethyl cellulose, hydroxypropylene cellulose, diacetylene cellulose, polyvinylchloride, polyvinylpyrrolidone, polytetrafluoroethylene, polyvinylidene fluoride, polyethylene, polypropylene, and combinations thereof, but are not limited thereto.

The solvent may be N-methylpyrrolidone, but is not limited thereto.

The rechargeable lithium battery generally includes a positive electrode, a negative electrode, and an electrolyte. The battery may further include a separator. The separator may include any material used in conventional lithium secondary batteries. Non-limiting examples of suitable separator materials include polyethylene, polypropylene, polyvinylidene fluoride, and multi-layers thereof, such as, a polyethylene/polypropylene double-layered separator, a polyethylene/polypropylene/polyethylene triple-layered separator, or a polypropylene/polyethylene/polypropylene triple-layered separator.

Rechargeable lithium batteries may be classified as lithium ion batteries, lithium ion polymer batteries, and lithium polymer batteries, according to the presence of a separator and the kind of electrolyte used in the battery. The rechargeable lithium batteries may have a variety of shapes and sizes, including cylindrical, prismatic, or coin-type, and may be a thin film battery or may be rather bulky in size. Structures and fabricating methods for lithium ion batteries, are well known in the art.

FIG. 1 is a schematic cross-sectional view of a rechargeable lithium battery, according to one exemplary embodiment of the present invention. Referring to FIG. 1, the rechargeable lithium battery 1 includes a negative electrode 2, a positive electrode 3, a separator 4 interposed between the positive electrode 3 and the negative electrode 2, and an electrolyte (not shown) in which the separator 4 is immersed, a cell case 5, and a sealing member 6 to seal the cell case 5.

The following Examples 1-9 illustrate aspects of the present invention in more detail. These examples, however, should not in any sense be interpreted as limiting the scope of the present invention.

EXAMPLES 1 TO 9

1.3M $LiPF_6$ was dissolved in a mixed solvent of ethylene carbonate (EC), dimethyl carbonate (DMC), and ethylmethyl carbonate (EMC), in a volume ratio of 30:30:40, and then adiponitrile was added thereto, to prepare an electrolyte solution. The adiponitrile (AN) was added in an amount of 1 wt % of the total weight of the electrolyte solution.

An $LiCoO_2$ positive active material, a polyvinylidene fluoride binder, and a Super-P conductive material were mixed in a weight ratio of 94:3:3 in an N-methylpyrrolidone solvent, to prepare a positive active material slurry. The positive active material slurry was coated on an aluminum current collector and then dried and compressed, to fabricate positive electrodes.

The compressing was performed by controlling the compressing pressure, time, and temperature, to fabricate positive electrodes having active-mass densities as shown in Table 1.

A graphite negative active material and a polyvinylidene fluoride binder were mixed in a weight ratio of 94:6 in an N-methylpyrrolidone solvent, to prepare a negative active material slurry. The slurry was coated on a copper current collector, dried, and compressed, to fabricate a negative electrode. When X-ray diffraction was measured using CuKα, the graphite negative active material had an Lc of about 100 nm. The graphite negative active material showed an exothermic peak at 700° C. or more.

Rechargeable lithium battery cells were fabricated using the above positive electrodes, negative electrode, and electrolyte solution, according to a conventional method.

COMPARATIVE EXAMPLES 1 TO 11

1.3M $LiPF_6$ was dissolved in a mixed solvent of ethylene carbonate (EC), dimethyl carbonate (DMC), and ethylmethyl carbonate (EMC), in a volume ratio of 30:30:40, and then adiponitrile was added thereto, to prepare an electrolyte solution.

An $LiCoO_2$ positive active material, a polyvinylidene fluoride binder, and a Super-P conductive material were mixed in a weight ratio of 94:3:3 in an N-methylpyrrolidone solvent, to prepare a positive active material slurry. The positive active material slurry was coated on an aluminum current collector, and then dried and compressed to fabricate positive electrodes.

The compressing was performed by controlling the compressing pressure, time, and temperature, to fabricate positive electrodes having active-mass densities as shown in Table 1.

A graphite negative active material and a polyvinylidene fluoride binder were mixed in a weight ratio of 94:6 in an N-methylpyrrolidone solvent, to prepare a negative active material slurry. The slurry was coated on a copper current collector, dried, and compressed to fabricate a negative electrode.

Rechargeable lithium battery cells were fabricated using the above positive electrodes, negative electrode, and electrolyte solution, according to a conventional method.

COMPARATIVE EXAMPLE 12

A rechargeable lithium battery cell was fabricated according to the same method as in Example 1, except that a positive electrode was fabricated to have an active-mass density of 3.6 g/cc.

COMPARATIVE EXAMPLE 13

A rechargeable lithium battery cell was fabricated according to the same method as in Example 1, except that a positive electrode was fabricated to have an active-mass density of 3.65 g/cc.

The fabricated rechargeable lithium battery cells, according to Examples 1 to 9 and Comparative Examples 1 to 13, were charged at 0.2 C and discharged at 0.2 C, for a formation process, and then charged at 0.5 C and discharged at 0.2 C for a standard process. In the following Table 1, cell capacity refers to a third-cycle discharge capacity for a standard process.

The battery cells were also charged and discharged at 1.0 C for 300 cycles, at a normal temperature of 25° C. and at a high temperature of 45° C. The cycle-life test results are shown in the following Table 1. In Table 1, the cycle-life was evaluated by the $300^{th}$ cycle discharge capacity ratio, relative to the first cycle discharge capacity.

TABLE 1

| | Active-mass density of positive electrode (g/cc) | Electrolyte solution (volume ratio) | 300th cycle-life at 25° C. (%) | 300th cycle-life at 45° C. (%) | Cell capacity (mAh) |
|---|---|---|---|---|---|
| Comparative Example 1 | 3.60 | 1.3M $LiPF_6$ EC/DMC/EMC (3/3/4) | 80 | 75 | 2600 |
| Comparative Example 2 | 3.65 | 1.3M $LiPF_6$ EC/DMC/EMC (3/3/4) | 79 | 74 | 2620 |

TABLE 1-continued

| | Active-mass density of positive electrode (g/cc) | Electrolyte solution (volume ratio) | 300th cycle-life at 25° C. (%) | 300th cycle-life at 45° C. (%) | Cell capacity (mAh) |
|---|---|---|---|---|---|
| Comparative Example 3 | 3.70 | 1.3M $LiPF_6$ EC/DMC/EMC (3/3/4) | 77 | 72 | 2640 |
| Comparative Example 4 | 3.75 | 1.3M $LiPF_6$ EC/DMC/EMC (3/3/4) | 72 | 67 | 2660 |
| Comparative Example 5 | 3.80 | 1.3M $LiPF_6$ EC/DMC/EMC (3/3/4) | 70 | 65 | 2680 |
| Comparative Example 6 | 3.85 | 1.3M $LiPF_6$ EC/DMC/EMC (3/3/4) | 68 | 63 | 2700 |
| Comparative Example 7 | 3.90 | 1.3M $LiPF_6$ EC/DMC/EMC (3/3/4) | 62 | 57 | 2720 |
| Comparative Example 8 | 3.95 | 1.3M $LiPF_6$ EC/DMC/EMC (3/3/4) | 60 | 55 | 2740 |
| Comparative Example 9 | 4.00 | 1.3M $LiPF_6$ EC/DMC/EMC (3/3/4) | 55 | 50 | 2760 |
| Comparative Example 10 | 4.05 | 1.3M $LiPF_6$ EC/DMC/EMC (3/3/4) | 47 | 42 | 2780 |
| Comparative Example 11 | 4.10 | 1.3M $LiPF_6$ EC/DMC/EMC (3/3/4) | 43 | 38 | 2800 |
| Comparative Example 12 | 3.60 | 1.3M $LiPF_6$ EC/DMC/EMC (3/3/4) + AN 1 wt % | 80 | 75 | 2600 |
| Comparative Example 13 | 3.65 | 1.3M $LiPF_6$ EC/DMC/EMC (3/3/4) + AN 1 wt % | 79 | 74 | 2620 |
| Example 1 | 3.70 | 1.3M $LiPF_6$ EC/DMC/EMC (3/3/4) + AN 1 wt % | 79 | 74 | 2640 |
| Example 2 | 3.75 | 1.3M $LiPF_6$ EC/DMC/EMC (3/3/4) + AN 1 wt % | 78 | 73 | 2660 |
| Example 3 | 3.80 | 1.3M $LiPF_6$ EC/DMC/EMC (3/3/4) + AN 1 wt % | 77 | 73 | 2680 |
| Example 4 | 3.85 | 1.3M $LiPF_6$ EC/DMC/EMC (3/3/4) + AN 1 wt % | 75 | 72 | 2700 |
| Example 5 | 3.90 | 1.3M $LiPF_6$ EC/DMC/EMC (3/3/4) + AN 1 wt % | 74 | 72 | 2720 |
| Example 6 | 3.95 | 1.3M $LiPF_6$ EC/DMC/EMC (3/3/4) + AN 1 wt % | 74 | 71 | 2740 |
| Example 7 | 4.00 | 1.3M $LiPF_6$ EC/DMC/EMC (3/3/4) + AN 1 wt % | 72 | 70 | 2760 |
| Example 8 | 4.05 | 1.3M $LiPF_6$ EC/DMC/EMC (3/3/4) + AN 1 wt % | 71 | 69 | 2780 |
| Example 9 | 4.10 | 1.3M $LiPF_6$ EC/DMC/EMC (3/3/4) + AN 1 wt % | 70 | 69 | 2800 |

As shown by the measurement results of Comparative Examples 1 to 11 in Table 1, as the active-mass densities of the positive electrodes were increased, the 300th cycle-life at both 25° C. and 45° C. was significantly decreased. However, the cells including the adiponitrile in the electrolyte solution, according to Examples 1 to 9, showed only a slightly reduced discharge capacity, at the 300th cycle at 25° C. and 45° C. In other words, the cells including the adiponitrile showed an improved cycle-life, even though the active-mass density of the positive electrode was increased. The measured results, of Comparative Examples 12 and 13, show that cycle-life improvements, according to the use of adiponitrile, were not obtained in the case where the active-mass density of the positive electrode was less than 3.7 g/cc. That is to say, the cycle-life improvements, according to the use of the adiponitrile, were realized when using a positive electrode having a high active-mass density of 3.7 g/cc or more.

EXAMPLES 10 TO 16

Rechargeable lithium battery cells were fabricated according to the same method as in Example 5, except that the adiponitrile amount was varied, as shown in the following Table 2.

The fabricated rechargeable lithium battery cells, according to Examples 10 to 16, were charged at 0.2 C and discharged at 0.2 C, for a formation process, and then charged at 0.5 C and discharged at 0.2 C for a standard process. In the following Table 2, capacity refers to a third-cycle discharge capacity for a standard process.

The battery cells were also charged and discharged at 1.0 C for 300 cycles at a normal temperature of 25° C. The cycle-life test results are shown in the following Table 2. In the following Table 2, the cycle-life was evaluated by the $300^{th}$ cycle discharge capacity ratio, relative to the first cycle discharge capacity.

Furthermore, in order to evaluate the cycle-life depending on the adiponitrile amount when the positive electrode has the same high active-mass density of 3.9 g/cc, the cycle-life and capacity of cells, according to Example 5 and Comparative Example 7, are also provided in Table 2.

TABLE 2

| | Active-mass density of positive electrode (g/cc) | Electrolyte solution (volume ratio) | 300$^{th}$ cycle-life at 25° C. (%) | Cell capacity (mAh) |
|---|---|---|---|---|
| Comparative Example 7 | 3.60 | 1.3M LiPF$_6$ EC/DMC/EMC (3/3/4) | 62 | 2600 |
| Example 5 | 3.90 | 1.3M LiPF$_6$ EC/DMC/EMC (3/3/4) + AN 1 wt % | 74 | 2720 |
| Example 10 | 3.90 | 1.3M LiPF$_6$ EC/DMC/EMC (3/3/4) + AN 0.1 wt % | 64 | 2720 |
| Example 11 | 3.90 | 1.3M LiPF$_6$ EC/DMC/EMC (3/3/4) + AN 0.5 wt % | 69 | 2720 |
| Example 12 | 3.90 | 1.3M LiPF$_6$ EC/DMC/EMC (3/3/4) + AN 2 wt % | 78 | 2720 |
| Example 13 | 3.90 | 1.3M LiPF$_6$ EC/DMC/EMC (3/3/4) + AN 3 wt % | 80 | 2720 |
| Example 14 | 3.90 | 1.3M LiPF$_6$ EC/DMC/EMC (3/3/4) + AN 5 wt % | 85 | 2720 |
| Example 15 | 3.90 | 1.3M LiPF$_6$ EC/DMC/EMC (3/3/4) + AN 7 wt % | 88 | 2720 |
| Example 16 | 3.90 | 1.3M LiPF$_6$ EC/DMC/EMC (3/3/4) + AN 10 wt % | 88 | 2720 |

As shown in Table 2, when the adiponitrile amount ranges from 0.1 to 10 wt %, the 300$^{th}$ cycle-life is improved as compared with Comparative Example 7 without the adiponitrile.

EXAMPLES 17 TO 23

Rechargeable lithium battery cells were fabricated, according to the same method as in Example 7, except that the adiponitrile amount was varied, as shown in the following Table 3.

The fabricated rechargeable lithium battery cells, according to Examples 17 to 23, were charged at 0.2 C and discharged at 0.2 C, for a formation process, and then charged at 0.5 C and discharged at 0.2 C for a standard process. In the following Table 3, capacity refers to a third-cycle discharge capacity for a standard process.

The battery cells were also charged and discharged at 1.0 C for 300 cycles at a normal temperature of 25° C. The cycle-life test results are shown in the following Table 3. In Table 3, the cycle-life was evaluated by the 300$^{th}$ cycle discharge capacity ratio, relative to the first cycle discharge capacity.

Furthermore, in order to evaluate the cycle-life depending on the adiponitrile amount when the positive electrode has the same high active-mass density of 4.0 g/cc, the cycle-life and capacity of cells, according to Example 7 and Comparative Example 9, are also provided in Table 3.

TABLE 3

| | Active-mass density of positive electrode (g/cc) | Electrolyte solution (volume ratio) | 300$^{th}$ cycle-life at 25° C. (%) | Cell capacity (mAh) |
|---|---|---|---|---|
| Comparative Example 9 | 4.00 | 1.3M LiPF$_6$ EC/DMC/EMC (3/3/4) | 55 | 2760 |
| Example 7 | 4.00 | 1.3M LiPF$_6$ EC/DMC/EMC (3/3/4) + AN 1 wt % | 72 | 2760 |
| Example 17 | 4.00 | 1.3M LiPF$_6$ EC/DMC/EMC (3/3/4) + AN 0.1 wt % | 60 | 2760 |
| Example 18 | 4.00 | 1.3M LiPF$_6$ EC/DMC/EMC (3/3/4) + AN 0.5 wt % | 65 | 2760 |
| Example 19 | 4.00 | 1.3M LiPF$_6$ EC/DMC/EMC (3/3/4) + AN 2 wt % | 75 | 2760 |
| Example 20 | 4.00 | 1.3M LiPF$_6$ EC/DMC/EMC (3/3/4) + AN 3 wt % | 78 | 2760 |
| Example 21 | 4.00 | 1.3M LiPF$_6$ EC/DMC/EMC (3/3/4) + AN 5 wt % | 80 | 2760 |
| Example 22 | 4.00 | 1.3M LiPF$_6$ EC/DMC/EMC (3/3/4) + AN 7 wt % | 85 | 2760 |
| Example 23 | 4.00 | 1.3M LiPF$_6$ EC/DMC/EMC (3/3/4) + AN 10 wt % | 84 | 2760 |

As shown in Table 3, when the adiponitrile amount ranges from 0.1 to 10 wt %, the 300$^{th}$ cycle-life is improved, as compared with Comparative Example 9 (without the adiponitrile).

When results of Comparative Examples 7 and 9 in Tables 2 and 3 are compared, the cells, without the adiponitrile and including a positive electrode having a higher active-mass density (3.9 g/cc vs. 4.00 g/cc), have an increased capacity, but the 300$^{th}$ cycle-life at a normal temperature was decreased by 7% (62% vs. 55%). On the contrary, the results of Examples 5, 10 to 16, 7, and 17 to 23 show similar cycle-life characteristics, indicating that cycle-life characteristics are more improved when the electrolyte includes the adiponitrile.

EXAMPLES 24 TO 32 AND COMPARATIVE EXAMPLE 1

Rechargeable lithium battery cells were fabricated according to the same method as in Example 1, except that succinonitrile (SN) was used instead of the adiponitrile, and the active-mass density of the positive electrodes were varied, as shown in the following Table 4.

The fabricated rechargeable lithium battery cells, according to Examples 24 to 34, were charged at 0.2 C and discharged at 0.2 C, for a formation process, and then charged at 0.5 C and discharged at 0.2 C for a standard process. In the following Table 4, cell capacity refers to a third-cycle discharge capacity for a standard process.

The battery cells were also charged and discharged at 1.0 C for 300 cycles, at a normal temperature of 25° C. The cycle-life test results are shown in the following Table 4. In Table 4, the cycle-life was evaluated by the $300^{th}$ cycle discharge capacity ratio, relative to the first cycle discharge capacity.

Furthermore, in order to evaluate the cycle-life depending on the use of the succinonitrile, the cycle-life and capacity of cells, according to Comparative Examples 1 to 11, are also provided in Table 4.

TABLE 4

| | Active-mass density of positive electrode (g/cc) | Electrolyte solution (volume ratio) | 300th cycle-life at 25° C. (%) | Cell capacity (mAh) |
|---|---|---|---|---|
| Comparative Example 1 | 3.60 | 1.3M LiPF$_6$ EC/DMC/EMC (3/3/4) | 80 | 2600 |
| Comparative Example 2 | 3.65 | 1.3M LiPF$_6$ EC/DMC/EMC (3/3/4) | 79 | 2620 |
| Comparative Example 3 | 3.70 | 1.3M LiPF$_6$ EC/DMC/EMC (3/3/4) | 77 | 2640 |
| Comparative Example 4 | 3.75 | 1.3M LiPF$_6$ EC/DMC/EMC (3/3/4) | 72 | 2660 |
| Comparative Example 5 | 3.80 | 1.3M LiPF$_6$ EC/DMC/EMC (3/3/4) | 70 | 2680 |
| Comparative Example 6 | 3.85 | 1.3M LiPF$_6$ EC/DMC/EMC (3/3/4) | 68 | 2700 |
| Comparative Example 7 | 3.90 | 1.3M LiPF$_6$ EC/DMC/EMC (3/3/4) | 62 | 2720 |
| Comparative Example 8 | 3.95 | 1.3M LiPF$_6$ EC/DMC/EMC (3/3/4) | 60 | 2740 |
| Comparative Example 9 | 4.00 | 1.3M LiPF$_6$ EC/DMC/EMC (3/3/4) | 55 | 2760 |
| Comparative Example 10 | 4.05 | 1.3M LiPF$_6$ EC/DMC/EMC (3/3/4) | 47 | 2780 |
| Comparative Example 11 | 4.10 | 1.3M LiPF$_6$ EC/DMC/EMC (3/3/4) | 43 | 2800 |
| Comparative Example 14 | 3.60 | 1.3M LiPF$_6$ EC/DMC/EMC (3/3/4) + SN 1 wt % | 81 | 2600 |
| Comparative Example 15 | 3.65 | 1.3M LiPF$_6$ EC/DMC/EMC (3/3/4) + SN 1 wt % | 80 | 2620 |
| Example 24 | 3.70 | 1.3M LiPF$_6$ EC/DMC/EMC (3/3/4) + SN 1 wt % | 80 | 2640 |
| Example 25 | 3.75 | 1.3M LiPF$_6$ EC/DMC/EMC (3/3/4) + SN 1 wt % | 76 | 2660 |
| Example 26 | 3.80 | 1.3M LiPF$_6$ EC/DMC/EMC (3/3/4) + SN 1 wt % | 75 | 2680 |
| Example 27 | 3.85 | 1.3M LiPF$_6$ EC/DMC/EMC (3/3/4) + SN 1 wt % | 73 | 2700 |
| Example 28 | 3.90 | 1.3M LiPF$_6$ EC/DMC/EMC (3/3/4) + SN 1 wt % | 72 | 2720 |
| Example 29 | 3.95 | 1.3M LiPF$_6$ EC/DMC/EMC (3/3/4) + SN 1 wt % | 72 | 2740 |
| Example 30 | 4.00 | 1.3M LiPF$_6$ EC/DMC/EMC (3/3/4) + SN 1 wt % | 69 | 2760 |
| Example 31 | 4.05 | 1.3M LiPF$_6$ EC/DMC/EMC (3/3/4) + SN 1 wt % | 68 | 2780 |
| Example 32 | 4.10 | 1.3M LiPF$_6$ EC/DMC/EMC (3/3/4) + SN 1 wt % | 67 | 2800 |

As shown in the measurement results of Comparative Examples 1 to 15 in Table 4, as the active-mass density of the positive electrode was increased, the $300^{th}$ cycle-life at 25° C. was significantly decreased. However, the cells including the succinonitrile in the electrolyte solution, according to Examples 24 to 32, showed little reduction in discharge capacity, at the $300^{th}$ cycle at 25° C. In other words, the cells including the succinonitrile showed improved cycle-life characteristics, even though the active-mass densities of the positive electrodes were increased. The results of Comparative Examples 14 and 15 show that such cycle-life improvements, according to the use of the succinonitrile, were not obtained when the active-mass density of the positive electrode was less than 3.7 g/cc. That is to say, such cycle-life improvements, according to the use of the succinonitrile, were realized when using a positive electrode having a high active-mass density of 3.7 g/cc or more.

As described above, the rechargeable lithium batteries, including a nitrile-based compound additive in an electrolyte, have high capacity as well as improved cycle-life characteristics at room temperature, even though the positive electrodes have high active-mass densities of 3.7 to 4.1 g/cc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A rechargeable lithium battery, comprising:
   a positive electrode comprising a positive active material comprising at least one selected from the group consisting of compounds of the following Formulas 2 to 25:

$$Li_aA_{1-b}B_bD_2, \quad \text{Formula 2:}$$

wherein $0.95 \leq a \leq 1.1$ and $0 \leq b \leq 0.5$;

$$Li_aE_{1-b}B_bO_{2-c}F_c, \quad \text{Formula 3:}$$

wherein $0.95 \leq a \leq 1.1$, $0 \leq b \leq 0.5$, and $0 \leq c \leq 0.05$;

$$LiE_{2-b}B_bO_{4-c}F_c, \quad \text{Formula 4:}$$

wherein $0 \leq b \leq 0.5$ and $0 \leq c \leq 0.05$;

$$Li_aNi_{1-b-c}Co_bB_cD_\alpha, \quad \text{Formula 5:}$$

wherein $0.95 \leq a \leq 1.1$, $0 \leq b \leq 0.5$, $0 \leq c \leq 0.05$, and $0 < \alpha \leq 2$;

$$Li_aNi_{1-b-c}Co_bB_cO_{2-\alpha}F_\alpha, \quad \text{Formula 6:}$$

wherein $0.95 \leq a \leq 1.1$, $0 \leq b \leq 0.5$, $0 \leq c \leq 0.05$, and $0 < \alpha < 2$;

$$Li_aNi_{1-b-c}Co_bB_cO_{2-\alpha}F_2, \quad \text{Formula 7:}$$

wherein $0.95 \leq a \leq 1.1$, $0 \leq b \leq 0.5$, $0 \leq c \leq 0.05$, and $0 < \alpha < 2$;

$$Li_aNi_{1-b-c}Mn_bB_cD_\alpha, \quad \text{Formula 8:}$$

wherein $0.95 \leq a \leq 1.1$, $0 \leq b \leq 0.5$, $0 \leq c \leq 0.05$, and $0 < \alpha \leq 2$, $$Li_aNi_{1-b-c}Mn_bB_cO_{2-\alpha}F_\alpha, \quad \text{Formula 9:}$$

wherein, $0.95 \leq a \leq 1.1$, $0 \leq b \leq 0.5$, $0 \leq c \leq 0.05$, and $0 < \alpha < 2$;

$$Li_aNi_{1-b-c}Mn_bB_cO_{2-\alpha}F_2, \quad \text{Formula 10:}$$

wherein $0.95 \leq a \leq 1.1$, $0 \leq b \leq 0.5$, $0 \leq c \leq 0.05$, and $0 < \alpha < 2$;

$$Li_aNi_bE_cG_dO_2, \quad \text{Formula 11:}$$

wherein $0.90 \leq a \leq 1.1$, $0 \leq b \leq 0.9$, $0 \leq c \leq 0.5$, and $0.001 \leq d \leq 0.1$;

$$Li_aNi_bCo_cMn_dG_eO_2, \quad \text{Formula 12:}$$

wherein $0.90 \leq a \leq 1.1$, $0 \leq b \leq 0.9$, $0 \leq c \leq 0.5$, $0 \leq d \leq 0.5$, and $0.001 \leq e \leq 0.1$;

$$Li_aNiG_bO_2, \quad \text{Formula 13:}$$

wherein $0.90 \leq a \leq 1.1$ and $0.001 \leq b \leq 0.1$;

$$Li_aCoG_bO_2, \quad \text{Formula 14:}$$

wherein $0.90 \leq a \leq 1.1$ and $0.001 \leq b \leq 0.1$;

$$Li_aMnG_bO_2, \quad \text{Formula 15:}$$

wherein $0.90 \leq a \leq 1.1$ and $0.001 \leq b \leq 0.1$;

$$Li_aMn_2G_bO_4, \quad \text{Formula 16:}$$

wherein $0.90 \leq a \leq 1.1$ and $0.001 \leq b \leq 0.1$;

$$QO_2; \quad \text{Formula 17:}$$

$$QS_2; \quad \text{Formula 18:}$$

$$LiQS_2; \quad \text{Formula 19:}$$

$$V_2O_5; \quad \text{Formula 20:}$$

$$LiV_2O_5; \quad \text{Formula 21:}$$

$$LiIO_2; \quad \text{Formula 22:}$$

$$LiNiVO_4; \quad \text{Formula 23:}$$

$$Li_{3-f}J_2(PO_4)_3 (0 \leq f \leq 3); \quad \text{Formula 24:}$$

and $$Li_{3-f}Fe_2(PO_4)_3 (0 \leq f \leq 2), \quad \text{Formula 25:}$$

wherein,

A is selected from the group consisting of Ni, Co, Mn, and a combination thereof, B is selected from the group consisting of Al, Ni, Co, Mn, Cr, Fe, Mg, Sr, V, a rare earth element, and a combination thereof, D is selected from the group consisting of O, F, S, P, and a combination thereof, E is selected from the group consisting of Co, Mn, and a combination thereof, F is selected from the group consisting of F, S, P, and a combination thereof, G is a transition element or a lanthanide element selected from the group consisting of Al, Cr, Mn, Fe, Mg, La, Ce, Sr, V, and a combination thereof, Q is an element selected from the group consisting of Ti, Mo, Mn, and a combination thereof, I is an element selected from the group consisting of Cr, V, Fe, Sc, Y, and a combination thereof, and J is an element selected from the group consisting of V, Cr, Mn, Co, Ni, Cu, and a combination thereof;

a negative electrode comprising a negative active material; and a non-aqueous electrolyte comprising a nitrile-based compound, a non-aqueous organic solvent, and a lithium salt, the nitrile-based compound being present in an amount of about 0.1 to about 10 wt % based on the total weight of the non-aqueous electrolyte, the nitrile-based compound comprising at least one selected from the group consisting of succinonitrile, adiponitrile and a combination thereof, wherein the positive electrode has an active-mass density of about 3.95 to about 4,1 g/cc.

2. The rechargeable lithium battery of claim 1, wherein the nitrile-based compound is succinonitrile.

3. The rechargeable lithium battery of claim 1, wherein the nitrile-based compound is adiponitrile.

4. The rechargeable lithium battery of claim 1, wherein the nitrile-based compound is present in an amount of about 0.5 to about 5 wt %, based on the total weight of the non-aqueous electrolyte.

5. The rechargeable lithium battery of claim 1, wherein the positive active material comprises a lithiated compound to intercalate and deintercalate lithium.

6. The rechargeable lithium battery of claim 1, wherein the negative active material comprises at least one selected from the group consisting of a carbonaceous material, a lithium metal, a lithium alloy, a material to form a lithium-containing compound, and a combination thereof.

7. The rechargeable lithium battery of claim 1, wherein the negative active material is a carbonaceous material.

8. The rechargeable lithium battery of claim 7, wherein the carbonaceous material has an Lc (crystallite size) of at least about 10 nm, as found through X-ray diffraction, and exhibits an exothermic peak at about 700° C. or more.

9. The rechargeable lithium battery of claim 1, wherein the non-aqueous organic solvent is selected from the group consisting of a carbonate-based solvent, an ester-based solvent, an ether-based solvent, a ketone-based solvent, an alcohol-based solvent, an aprotic solvent, and a combination thereof.

10. The rechargeable lithium battery of claim 1, wherein the lithium salt is at least one selected from the group consisting of $LiPF_6$, $LiBF_4$, $LiSbF_6$, $LiAsF_6$, $LiCF_3SO_3$, $LiN(SO_2C_2F_5)_2$, $LiN(CF_3SO_2)_2$, $LiC_4F_9SO_3$, $LiClO_4$, $LiAlO_4$, $LiAlCl_4$, $LiN(C_xF_{2x+1}SO_2)(C_yF_{2y+1}SO_2)$ (wherein, x and y are natural numbers), LiCl, LiI, lithium bisoxalate borate, and a combination thereof.

11. The rechargeable lithium battery of claim 1, wherein the lithium salt is present at a concentration of about 0.1 to 2.0M.

* * * * *